United States Patent
Hukuda

[11] Patent Number: 6,022,053
[45] Date of Patent: Feb. 8, 2000

[54] JOINT FOR COUPLING TUBES

[75] Inventor: Shin-Ichi Hukuda, Tokyo, Japan

[73] Assignee: Flowell Corporation, Tokyo, Japan

[21] Appl. No.: 09/048,185

[22] Filed: Mar. 26, 1998

[30] Foreign Application Priority Data

Mar. 27, 1997 [JP] Japan .................................. 9-002740
Dec. 24, 1997 [JP] Japan .................................. 9-355206

[51] Int. Cl.[7] .................................................. F16L 19/00
[52] U.S. Cl. ........................ 285/331; 285/354; 285/246; 285/423
[58] Field of Search ................... 285/331, 354, 285/246, 247, 423

[56] References Cited

U.S. PATENT DOCUMENTS

| | | | |
|---|---|---|---|
| 545,928 | 9/1895 | Whitmore | 285/331 |
| 771,682 | 10/1904 | Sussman | 285/331 |
| 2,544,108 | 3/1951 | Richardson | 285/331 |
| 4,508,374 | 4/1985 | Kantor | 285/331 |

FOREIGN PATENT DOCUMENTS

| | | | |
|---|---|---|---|
| 404892 | 1/1946 | Italy | 285/331 |
| 62-86489 | 6/1987 | Japan . | |
| 6-50714 | 11/1992 | Japan . | |
| 8-247353 | 9/1996 | Japan . | |
| 6769 | 6/1885 | United Kingdom | 285/331 |
| 443991 | 3/1936 | United Kingdom | 285/331 |

*Primary Examiner*—Eric K. Nicholson
*Attorney, Agent, or Firm*—Armstrong, Westerman, Hattori, McLeland & Naughton

[57] ABSTRACT

A joint for coupling tubes forming a large diameter portion near one end of a fluorocarbon resin tube and forming a fastened portion by clamping at a crimp portion of the large diameter portion with a cap nut includes of a main body of rigid resin joint having a cylindrical portion formed a ring-shaped groove and cut a bevel at its inner wall end and a hard cap nut having a inner shoulder formed an acute-angle hook. The major portion of the large diameter portion of the fluorocarbon resin tube is inserted into the ring-shaped groove. A tube clamp portion as a hermetic portion is formed to press hard a tube crimp portion against the inner wall end of the cylindrical portion with the inner shoulder of the hard cap nut by tightening the hard cap nut on an external thread of the outer wall of the cylindrical portion.

3 Claims, 4 Drawing Sheets

FIG.8

| RECOVERY RATE | THIS INVENTION (BEVEL ANGLE : 30°) | PRIOR ART (NO BEVEL ANGLE) |
| --- | --- | --- |
| 50% | 47 | 143 |
| 90% | 113 | 588 |

FIG.9

MEASURED DRAWING STRENGTH

| TUBE SIZE | THIS INVENTION (TAPER ANGLE : 20°) | PRIOR ART (NO TAPER ANGLE) |
| --- | --- | --- |
| φ9.53 × φ7.53 | 385 N | 319 N |
| φ6.35 × φ4.35 | 240 N | 197 N |

100
JOINT FOR COUPLING TUBES

BACKGROUND OF THE INVENTION

1. Field of the Invention

This invention relates to a joint for coupling tubes, especially fluorocarbon resin tubes, for flowing liquid such as pure water and/a general chemical liquid, used in a clean room in a high-density semiconductor chip manufacturing plant.

2. Description of the Prior Art

This kind of joint is disclosed in Japanese Utility Model Laid-Open No. Heisei 4-122882.

The joint has a deformed tube portion which prevents the tube from coming out of the joint. The joint consists of a fluorocarbon resin tube, the cylindrical main body of the joint, a cap nut and a ring member. The fluorocarbon resin tube has different diameter portion, and a collar is formed at the end of a large diameter portion. A ring-shaped groove where the larger end of the fluorocarbon resin tube is inserted is formed from one end to the mid-portion of the cylindrical main body. The cylindrical main body has threads cut on its outer surface. The major portion of the ring member is also inserted into the ring-shaped groove around the larger end of the fluorocarbon resin tube. To fasten the cylindrical main body with the cap nub, the fluorocarbon ring tube is pressed against the collar tight and then said deformed tube portion is formed. The shoulder of the cap nut presses the intermediate portion of the fluorocarbon resin tube against the end of the cylindrical main body and thereby crimped portion is formed.

In this prior art, two heat-treatment processes and much time is required to form the deformed tube portion. Further, some skill is required in the heat treatment because the collar shape becomes contorted and tight clamping is impossible if temperature variations occurs in heat convection.

Further, quick movements are required to rapidly force the large diameter portion into the cylindrical main body before the large diameter portion becomes cool because the crimped portion contracts gradually after the mold is removed.

A well known kind of prior art joint is disclosed in Japanese Utility Model Laid Open No. Showa 62-86489. A tube of this joint has a large diameter portion and a reinforcing member is forced into there. When a cap nut is tightened to press the large diameter portion, accommodated in the nut, against the main body of the joint, the joint can prevent a tube from coming out of the joint.

This prior art joint has no member for clamping the portion where the large diameter portion and a tube are connected to the main body, and so the tube comes out of the joint easily at high temperature and the hermetic performance as the joint is low. Especially when the outer surface of the tube is slippery as a surface of fluorocarbon resin tube, the tube comes out of the joint frequently and the looseness of the cap nut becomes larger over time.

This joint and the disclosed one in said Japanese Utility Model Laid Open No. Heisei 4-122882 have a common problem as follows. Distortion occurs in the main body, the reinforcing member and the tube deform by using under high temperature or long time use and it causes gaps between contact surfaces among the inner surface of the tube and other members. As a consequence, liquid residue or accumulated polishing particulate in the gaps makes the diameter small.

Accordingly, it is an object of the present invention to solve the above-mentioned problems of the prior art. The invention has a tube clamp portion as a hermetic portion formed by clamping tightly a large diameter portion of the tube inserted into the ring-shaped groove of the cylindrical main body of the joint with a cap nut and pressing firmly a crimp portion of the tube formed at the beginning of the large diameter portion against the end of the cylindrical main body with the hook of the cap nut, and a bevel cut at the end of the cylindrical main body prevents liquid residue from building up.

The point of the present invention to accomplish the foregoing and other objects are as follows.

SUMMARY OF THE INVENTION

To solve the above-mentioned problems, the present invention or a joint for coupling tubes constructed as mentioned hereinafter.

[1] A joint for coupling tubes forming a large diameter portion near one end of a fluorocarbon resin tube and forming a fastened portion by clamping at a crimp portion of the large diameter portion (T2) with a cap nut consisting of a main body (10) of rigid resin joint having a cylindrical portion (12) formed a ring-shaped groove (12a) and cut a bevel (19a) at its inner wall end (12b) and a hard cap nut (20) having a inner shoulder (26a) formed an acute-angle hook (22a), wherein the major portion of the large diameter portion of the fluorocarbon resin tube is inserted into the ring-shaped groove (12a), wherein a tube clamp portion as a hermetic portion is formed to press hard a tube crimp portion (T3) against the inner wall end (12b) of the cylindrical portion (12) with the inner shoulder (26a) of the hard cap nut (20) by tightening the hard cap nut (20) on an external thread (13) of the outer wall of the cylindrical portion (12).

[2] A joint for coupling tubes by fitting one end of the tube (T) around the end portion of a main body (10) of the joint inserted into the tapped hole (21) of a cap nut (20) and supporting the end of the tube (T) with the cap nut (20) screwed on the main body (10), said cap nut (20) having an inner wall (22) formed in the tapped hole (21) orthogonal to the center line of the tapped hole (21), an internal thread (23) formed on the inner surface (21a) of the tapped hole (21) and an insertion opening (24) cut through the inner wall (22) along the center line for inserting the tube (T), said main body (10) of the joint having a cylindrical portion (12) formed at the end of the main body being inserted into the tapped hole (21) of the cap nut (20) where the tube (T) inserted into there through the insertion opening (24) fitting around it with keeping the expanded end (T2), an external thread (13) formed on a base side, from which the cylindrical portion (12) being elongated, for screwing into the cap nut (20) and a through hole (14) cut through the main body (10) along its center line having approximately the same diameter as the inner diameter of the tube (T) and cut a bevel (19a) at its end of the cylindrical portion (12), the bevel (19a) being formed from the inside of the through hole (14) to the outside said minor diameter of the internal thread (23) and the diameter of the inner surface (21a) of the cap nut (20) being nearly equal or slightly larger than the outer diameter of the tube (T) fitted around the cylindrical portion (12). [3] A joint for coupling tubes by fitting one end of the tube (T) around the end portion of a main body (10) of the joint inserted into the tapped hole (21) of a cap nut (20) and supporting the end of the tube (T) with the cap nut (20) screwed on the main body (10), said cap nut (20) having an inner wall (22) formed in the tapped hole (21) orthogonal to the center line of the tapped hole (21) and having an acute-angle hook (22a) sloped towards a point at the center line in the tapped hole (21), an internal thread (23) formed on the inner surface (21a) of the tapped hole (21), and an insertion opening (24) cut through the inner wall (22) along the center line for inserting the tube (T), said main body (10) of the joint having a cylindrical portion (12) formed at the end of the main body being inserted into the tapped hole (21) of the cap nut (20) where the tube (T) inserted into there through the insertion opening (24) fitting around it with keeping the expanded end (T2), an external thread (13) formed on a base side, from which the cylindrical portion (12) being elongated, for screwing into the cap nut (20) and a through hole (14) cut through the main body (10) along its center line having approximately the same diameter as the inner diameter of the tube (T) and cut a bevel (19a) at its end of the cylindrical portion (12), the bevel (19a) being formed from the inside of the through hole (14) to the outside of the hole, said minor diameter of the internal thread (23) and the diameter of the inner surface (21a) of the cap nut (20) being equal or nearly equal to the outer diameter of the tube (T) fitted around the cylindrical portion.

According to the invention, the fastened portion is formed by making the large diameter portion (T2) near the end of a fluorocarbon resin tube and tightening the crimp portion of the large diameter portion (T2) around the cylindrical portion (12) with the cap nut (20). The cylindrical portion (12) of the main body (10) of rigid resin joint has the ring-shaped groove (12a), and the large diameter portion (T2) is inserted into the ring-shaped groove (12a). The hard cap nut (20) is screwed on the external thread (13) of the outer wall of the cylindrical portion (12) of the main body (10). The tube crimp portion (T3) is pressed against the inner wall end (12b) of the cylindrical portion (12) with the acute-angle hook (22a) of the inner shoulder (26a) of the hard cap nut (20); therefore, the tube clamp portion works as a hermetic portion.

Furthermore according to the invention, one end of the tube (T) is inserted into the tapped hole (21) through the insertion opening (24) cut through the inner wall (22) of the cap nut (20). The inserted end of the tube (T) is fitted around the cylindrical portion (12) of the main body (10) with keeping the expanded portion.

If the end of the main body (10) is inserted into the tapped hole (21) of the cap nut (20) and the cap nut (20) is screwed on the external thread (13) of the main body (10), the end of the tube is supported.

As the minor diameter of the internal thread (23) and the diameter of the inner surface (21a) of the cap nut (20) is nearly equal or slightly larger than the outer diameter of the tube (T) fitted around the cylindrical portion (12), the internal thread (23) and the diameter of the inner surface (21a) of the cap nut (20) is formed minimum so that the tube (T) can pass through the cap nut (20) and the inner surface (21a), and thereby the outer surface (21a) of the cap nut (20) can be made smallest possible and the joint can be made miniaturize.

Furthermore, a fluid in the tube (T) is passed into the through hole (14) without a large resistance because the diameter of the through hole (14) is nearly equal to the inner diameter of the tube (T) and so there is no sharp change in the diameter of a passage.

As a bevel (19a) which is formed from the inside of the through hole (14) to the outside of the hole is cut at the end of the cylindrical portion (12), the sectional shape of a groove at the portion where the tube and the main body (10) of the joint are connected is not sharp, and so a fluid stands hardly at the groove. Therefore, washing such as pure water is not contaminated, and particulate included in the fluid is prevented from piling up in the groove.

Furthermore, in another embodiment of the invention, the inner wall (22) formed in the tapped hole (21) has the acute-angle hook (22a) that slopes towards a point at the center line in the tapped hole (21) and whose sectional shape is sharp. As the end of the main body (10) is inserted into the tapped hole (21) and the cap nut (20) is screwed on the external thread (13) of the main body (10), the acute-angle hook (22a) interlocks the tube crimp portion (T3) of the tube (T) fitted around the cylindrical portion (12) of the main body (10) with keeping the expanded portion and thereby the tube (T) hardly slips out of the tapped hole (12).

BRIEF DESCRIPTION OF THE DRAWINGS

FIG. 8 shows the recovery time of the liquid of the second embodiment of the joint of the present invention and that of the prior art; and FIG. 9 shows the drawing strength of the second embodiment of the joint of the present invention and that of the prior art.

DETAILED DESCRIPTION

Figure 1:
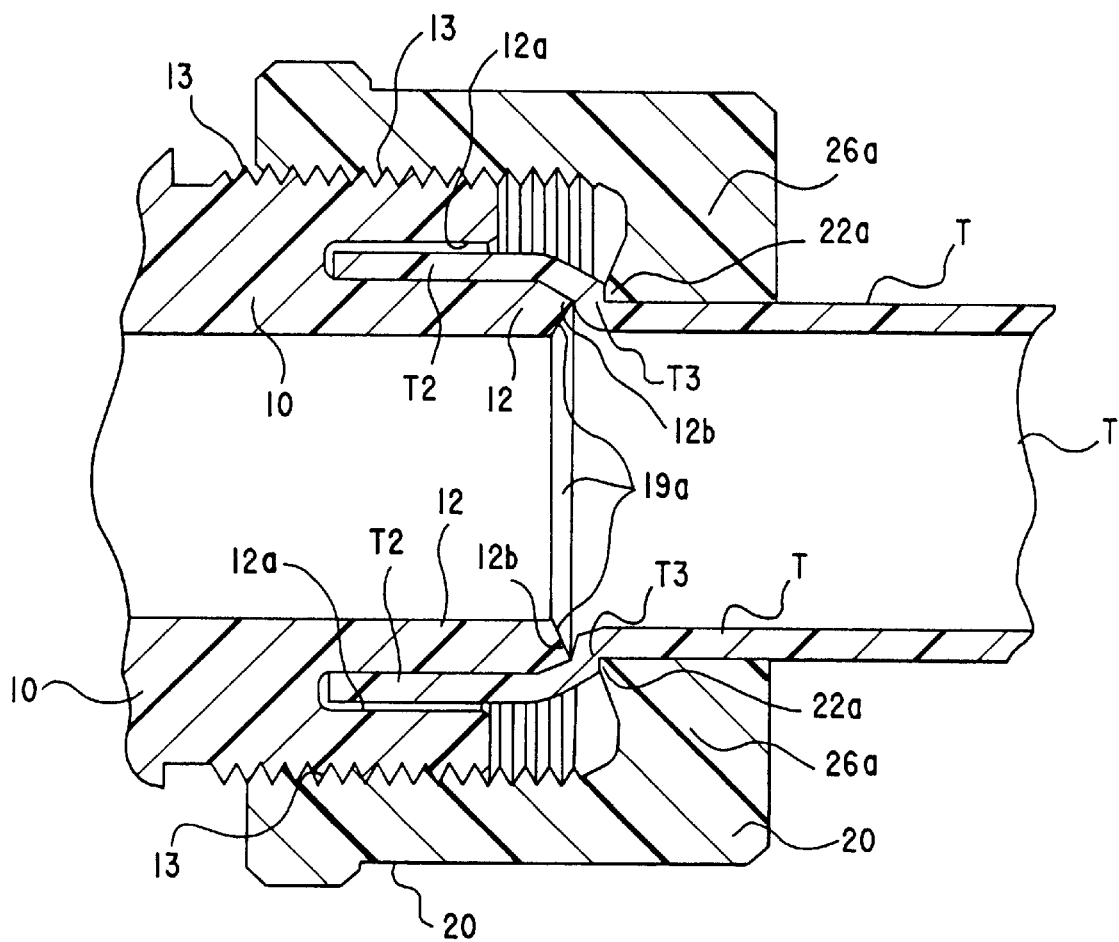
FIG. 1 is an enlarged vertical sectional view of the present invention.

The various embodiments of the present invention are shown in the drawings.

The first embodiment of the present invention is shown in FIGS. 1~5.

Figure 2:
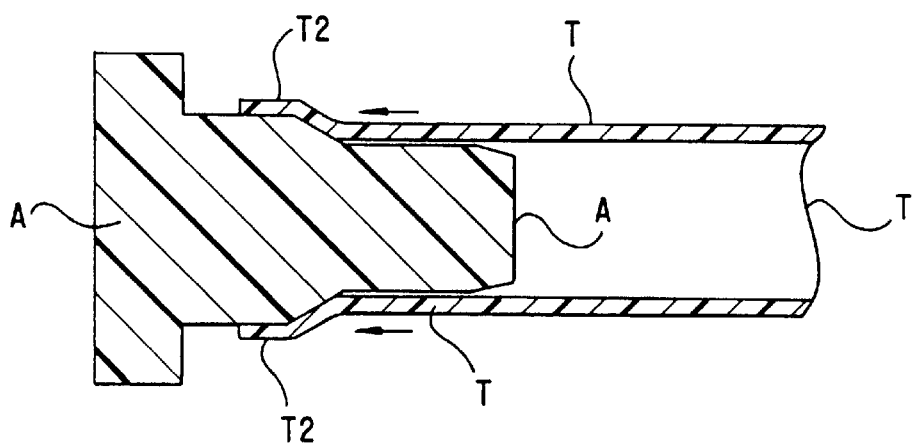
FIG. 2 is an sectional view of the enlarged portion of the tube of the first embodiment.

The tube T is made of synthetic resin, for example, polytetrafluoroethylene (PTFE), fluorocarbon resin (PFA) and so forth. As shown in FIG. 2, the large diameter portion T2 is formed by inserting a heated enlarging jig A into one end of the tube T.

Figure 3:
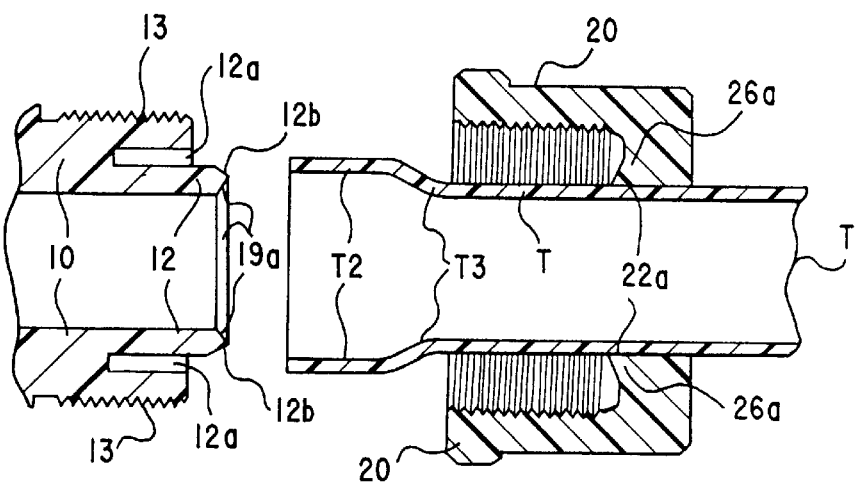
FIG. 3 is a partial sectional view of the joint of the first embodiment of the present invention in an assembling step.

As shown in FIG. 3, the cylindrical portion 12 of the main body 10 of a rigid resin joint is formed with a ring-shaped groove 12a. The rigid resin joint is made of fluorocarbon resin, polypropylene and so forth. The large diameter portion T2 is inserted into the ring-shaped groove 12a, as shown in FIG. 4.

Figure 4:
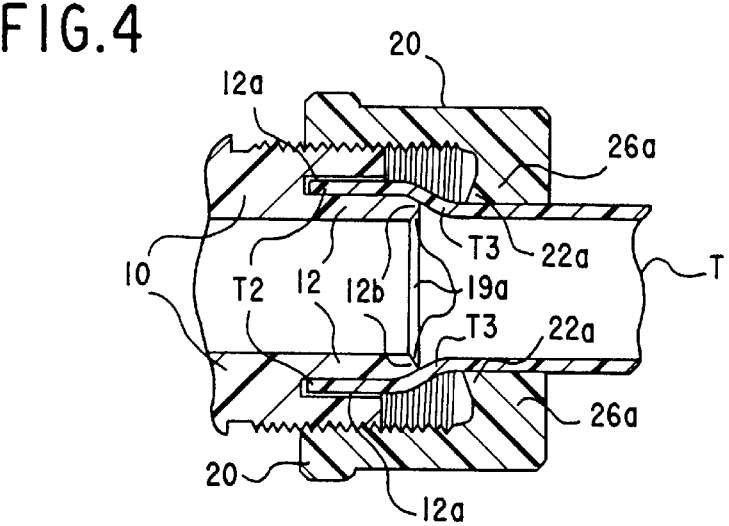
FIG. 4 is another partial sectional view of the joint of the first embodiment of the present invention in another assembling step.
Figure 5:
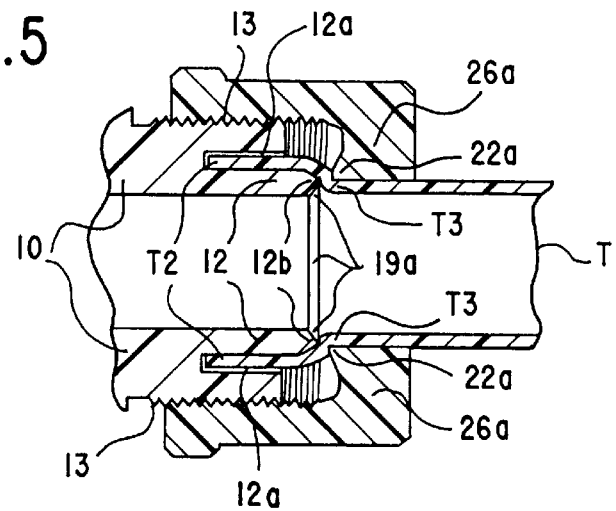
FIG. 5 is another partial sectional view of the joint of the first embodiment of the present invention in an assembling step.

As shown in FIGS. 4 and 5, a hard cap nut 20, made of fluorocarbon resin, polypropylene and so forth, is tightened on the outer wall of the main body 10 where an external thread 13 is formed. An acute-angle hook 22a, which is formed on a inner shoulder 26a of the cap nut 20, presses hard to form a tube crimp portion T3 against the inner wall end 12b of the cylindrical portion 12 as shown in FIGS. 1 and 5. Thus, a hermetic seal is formed by the tube crimp portion.

A bevel 19a is formed at the inner wall end 12b of the main body 10 so that the inner wall near the end 12b will not be so thin that it will deform, and accordingly the joint of the present invention has no gap between the main body 10 and the tube 12, thereby prevent an accumulation of fluid at that location.

The material of said members may be selected to be appropriate for the kind of fluid flowing in the tube and the main body 10 of the joint. When the joint is used under a relatively rough condition, members except the tube may be made by a tough material such as metal to obtain high strength of the joint.

When the joint is used under a severe condition such as in a super-density semiconductor chip manufacturing plant, the tube and all other members are made by a fluorocarbon resin such as PTFE or PFA. Such a flow tube passage through which semiconductor chip washing liquid passes has enough performance to use in manufacturing a high-density VLSI (very large scale integrated circuit).

Figure 6:
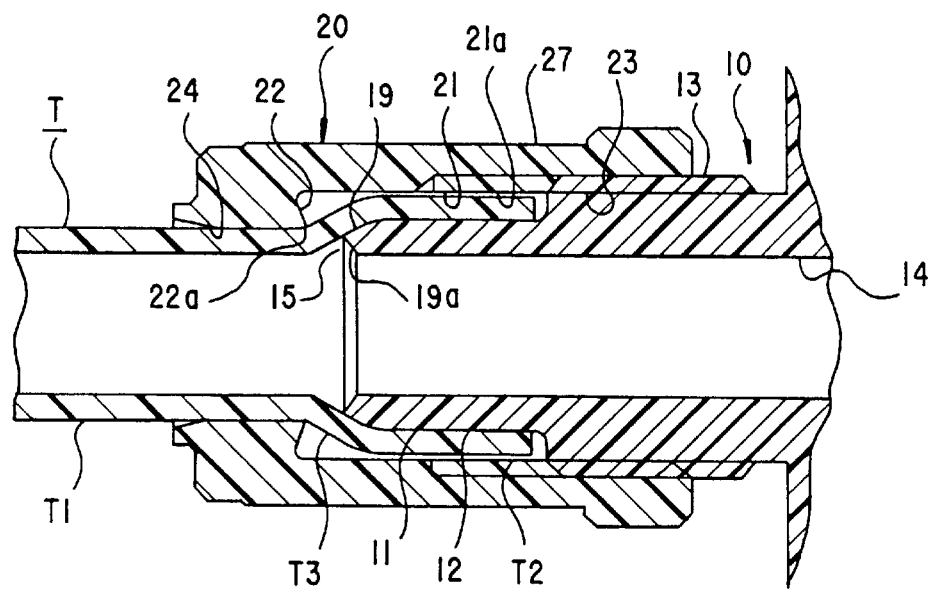
FIG. 6 is a partial sectional view of the joint of the second embodiment of the present invention.
Figure 7:
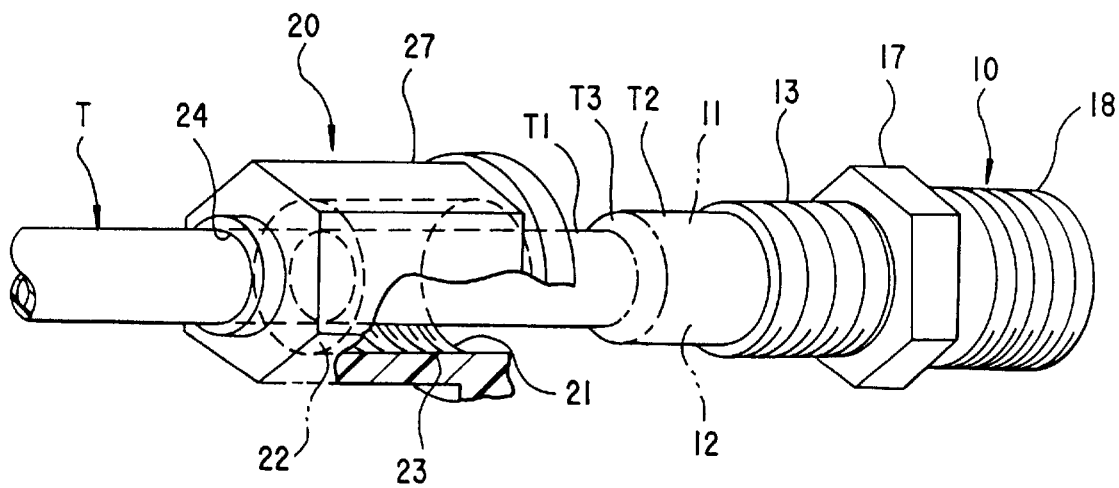
FIG. 7 is an exploded perspective view of the joint of the second embodiment of the present invention.

FIG. 6 is a partial sectional view of the joint of a second embodiment of the present invention. FIG. 7 is an exploded perspective view of the same joint of the second embodiment.

As shown FIGS. 6 and 7, the joint of this embodiment consists of a main body 10 made of fluorocarbon resin tube and a cap nut 20 made of fluorocarbon resin.

Both PTFE (polytetrafluoroethylene) and PFA (tetrafluoroethylene/perfluoroalkylvinylether copolymer) have excellent chemical resistance and are good example of fluorocarbon resin.

A cap nut 20 has the inner wall 22 that is formed in a tapped hole 21 and is approximately orthogonal to the center line of the hole 21. An internal thread 23 is formed on the entrance side inner surface 21a of the tapped hole 21 and an insertion opening 24 into which the tube T is inserted is cut through the inner wall 22 along the center line.

The cross section of the cap nut 20 is almost hexagonal and has a clamp portion 27 for clamping there by a nut clamping tool (or wrench).

The main body 10 is formed a cylindrical portion 12 in one end which is inserted into the tapped hole 21 of the cap nut 20. The tube T is inserted into the tapped hole 21 through the insertion opening 24 of the cap nut 20, and the cylindrical portion 12 is inserted into the tube and so the end of the tube expands and fits on the cylindrical portion 12. Therefore, the portion of the tube T inserted into the tapped hole 21 is composed of a normal diameter portion T1, a large diameter portion T2 which fits on the cylindrical portion 12 and a tube crimp portion T3 (or a flare) as a intermediate portion which is between the large diameter portion T2 and the cylindrical portion 12.

An external thread 13 is threaded on a base side, from which the cylindrical portion 12 is elongated, for screwing into the tapped hole 21 threaded the internal thread 23. The minor diameter of the internal thread 23 of the cap nut 20 and the diameter of the inner surface 21a of the tapped hole 21 of the cap nut 20 is bored slightly larger than the outer diameter of the large diameter portion T2 so that the large diameter portion T2 is relatively possible to be inserted into the cap nut 20 and the minor diameter of the internal thread 23 and the diameter of the inner surface 21a can be made smallest. As the difference between the minor diameter of the internal thread 23 (and diameter of the inner surface 21a) and the outer diameter of the large diameter portion T2 is small, assembling work is generally difficult but the outer diameter of the cap nut 20 can be made smaller.

As the root of the internal thread 23 makes shallow, the thickness of the cap nut 20 at the root of the thread increases and the stiffness of the cap nut 20 becomes strong, but the strength against the drawing force along the axis of the internal thread 23 weaken generally. To prevent the strength from weakening, the length of the internal thread 23 may be made long.

The joint has a clamp portion 17 which has the cross section nearly same that of the clamp portion of the cap nut 20 at the center portion of the main body 10. An external thread 18 whose diameter is larger than that of the external thread 13 is threaded on the base end portion of the main body 10 of the joint.

A through hole 14 which has the diameter nearly same to the inner diameter of the tube T passes through along the axis of the main body 10.

In this embodiment, although the large external thread 18 is formed on the base end portion, the diameter of the large external thread 18 may be the same as the external thread 13. Although the axis of the large external thread 18 and that of the external thread 13 are in the same direction, the axis of the large external thread 18 may meet that of the external thread 13 at a right angle when the through hole 14 curved like a L letter. Furthermore, the external thread 18 may be threaded in the both ends met the axis of the external thread 13 at right angles when the through hole 14 is a T-shaped junction.

When an end 11 of the main body 10 of the joint is inserted into the tapped hole 21 of the cap nut 20, the inner wall 22 of the cap nut 20 and an entrance 15 face each other on the line being parallel to the axis.

An outer peripheral of the entrance 15 of the through hole 14 is cut a bevel 19 so that the end of the tube T can fit on the cylindrical portion 12 easily and maintain stable tightness performance. An inner peripheral of the entrance 15 is cut a bevel 19a for preventing a fluid from remaining around there.

The cylindrical portion 12 has enough thickness and necessary stiffness so that it can prevent deformation of itself against a clamping force of the cap nut 20. An inner wall 22 of the cap nut 20 is formed as an acute-angle hook 22a which is elongated towards the center line (or the axis of the internal thread 23) of an insertion opening 24 and is inclined at the given angle (25 degrees to 35 degrees) to the entrance 15 of the through hole 14 of the main body 10.

The operation of the second embodiment is explained hereinafter.

As shown in FIG. 7, the end of the tube T is inserted into the tapped hole 21 through the insertion opening 24 of the cap nut 20, and the expanded end T2 of the end of the tube T fits on the cylindrical portion 12 or the end of the main body 10 of the joint. The tube crimp portion T3 which is formed between the large diameter portion T2 and the normal diameter portion T1 spreads along the bevel 19 of the cylindrical portion 12 of the main body 10 of the joint.

Then the beginning end of the external thread 13 of the main body 10 contacts with the beginning of the internal thread 23 of the cap nut 20 as the end 11 of the main body 10 is screwed into the tapped hole 21 of the cap nut 20. Then the large diameter portion T2 inserts into the tapped hole 21 of the cap nut 20 (screw thread of the internal thread 23 or the inner surface 21a of the tapped hole 21) with keeping slightly space or slide on the tapped hale 21.

Then fit a wrench over the clamp portion 27 of the cap nut and another wrench over the clamp portion 17 of the main body 10, and twist them relatively, the external thread 13 of the main body 10 screws into the internal thread 23 of the cap nut 20.

When the external thread 13 of the main body 10 screws completely into the internal thread 23 of the cap nut 20, the acute-angle hook 22a formed on a inner wall 22 of the cap nut 20 interlocks the tube crimp portion T3, and so prevent the tube T slipping out of the tapped hole 12. Furthermore, as the bevel 19 of the main body 10 of the joint press hard to the tube T, high tightness performance can be obtained.

As the minor diameter of the internal thread 23 of the cap nut 20 and the diameter of the inner surface 21a of the tapped hole 21 of the cap nut 20 are bored slightly larger than (or equal to) the outer diameter of the large diameter portion T2 fitted on the cylindrical portion 12, the minor diameter of the internal thread 23 and the diameter of the inner surface 21a is made smallest so that the large diameter portion T2 is possible to be inserted into the cap nut 20; therefore, the outer diameter of the cap nut 20 can be made smallest possibly and so the joint can be made smaller than the prior art.

The fluid such as pure water for washing, various kind of chemical liquid, liquid containing polishing particles and so forth flows in the main body 10 of the joint and the tube T. When the fluid flows through the tube T into the through hole 14 of the main body 10 of the joint, a large resistance does not generate between their surface and the flowing fluid because the diameter of the through hole 14 is nearly equal to the inner diameter of the tube T and so there is no sharp change in the diameter of a passage.

Furthermore, although there is some possibility that the fluid in the tube T passing through the through hole 14 of the main body 10 of the joint remains at a portion where the tube T and the main body 10 are connected, fluid stands hardly at the groove since the sectional shape of a groove at the portion is not sharp because of the bevel 19a cut around the entrance 15 of the through hole 14. Therefore, washing such as pure water is not contaminated because it does not stand long time in the groove, and the diameter of the tube T is prevented from being small caused by particulate included in the fluid piling up in the groove.

Residual fluid recovery time at the bevel 19a of the main body 10 will be explained with referring to FIG. 8.

FIG. 8 shows the measured substitution characteristic about two combinations of a PFA (perfluoroalkyl) tube T and a joint. The outer diameter of the tube T is 6.35 mm and its inner diameter is 4.35 mm. One is the combination of the tube T and the joint of said second embodiment. The other is the combination of the tube T and the joint of the prior art. In the measurement or the substitution characteristic, first, we filled said each laid combination with sulfuric acid ($H_2SO_4$) for 30 minutes. Then we drained the sulfuric acid from the combination, and measured resistance rates at the exit of the combination and at that of the existence with pouring pure water into the exit.

The result of the measurement, as shown in FIG. 8, shows that the recovery time of the liquid in the joint of the second embodiment is shortened about 1/3 to 1/5 of that of the prior art.

The recovery rate shown in FIG. 8 is obtained with the following expression.

Recovery Rate=(the resistance rate at the exit of the combination/the resistance rate at the entrance of the combination)×100%

FIG. 9 shows the relation between the taper angle of the acute-angle hook 22a of the main body and the drawing strength.

FIG. 9 shows the measured drawing strength about four combinations of PFA tube T and a joint. The outer diameter of one tube T is 9.53 mm and its inner diameter is 7.53 mm. The outer diameter of the other tube T is 6.35 mm and its inner diameter is 4.35 mm. One is the combination of the former tube T and the joint of said second embodiment. Another is the combination of the later tube T and the joint of said second. Another is the combination of the former tube T and the joint of the prior art. The other is the combination of later tube T and the joint of the prior art.

The drawing strength of said each laid combination is measured with a tension tester.

The result of the measurement, as shown in FIG. 9, shows that the drawing strength about the joint of the second embodiment is improved about 20% compared to that of the prior art.

According to one embodiment of the joint of the present invention, if the tube crimp portion T3 is press hard against the end of the cylindrical portion 12 of the main body 10 with the acute-angle hook 22a of the inner shoulder 26a of the cap nut 20 by clamping the tube crimp portion T3 inserted into the ring-shaped groove 12a of the main body 10 tight with the cap nut 20 to the cylindrical portion 12 of the main body 10, the tube clamp portion as a hermetic portion. Thus tube T connected to the main body 10 almost never loosens and is hardly pulled out and so the safety can be kept for a long time.

According to another embodiment of the joint of the present invention, the bevel 19a is cut at the inner wall end 12b of the ring-shaped groove 12a of the main body 10 and so the inner wall end 12b and near portion are prevented from the distortion being generated by using under high temperature environment. Therefore, liquid residue and washing pure water contamination are not generated, and the joint is suitable for use in the washing process of a very large scale integration chip.

According to another embodiment of the joint of the present invention, as the minor diameter of the internal thread of the cap nut and the diameter of the inner surface of the tapped hole of the cap nut are bored slightly larger than (or equal to) the outer diameter of the large diameter portion fitted on the cylindrical portion, the minor diameter of the internal thread and the diameter of the inner surface is made smallest so that the large diameter portion is possible to be inserted into the cap nut; therefore, the outer diameter of the cap nut can be made smallest possibly and so the joint can be made smaller than the prior art. Furthermore, space among joins adjacent to each other can be smallest possibly; therefore a small-sized apparatus can be realized and the materials cost of the joint can be reduced.

Furthermore, as the bevel formed from the inside of the through hole to the outside of the hole is cut at the end of the cylindrical portion, the sectional shape of a groove at the portion where the tube and the main body of the joint are connected is not sharp, and so a fluid stands hardly at the groove. Therefore, washing such as pure water is not contaminated, and particulate included in the fluid is prevented from piling up in the groove and making the inner diameter of the tube small.

Furthermore, the inner wall formed in the tapped hole has the acute-angle hook that slopes towards a point at the center line in the tapped hole and whose sectional shape is sharp. As the end of the main body is inserted into the tapped hole and the cap nut is screwed on the external thread of the main body, the acute-angle hook interlocks the tube crimp portion of the tube fitted around the cylindrical portion of the main body with keeping the expanded portion and thereby the tube hardly slips out of the tapped hole.

What is claimed is:

1. A joint for coupling tubes of a fluorocarbon resin, having a normal diameter portion, a large diameter portion near one end, and a crimp portion between said normal diameter portion and said large diameter portion prior to engagement with said joint, and forming a fastened portion by clamping said crimp portion with a cap nut consisting of a main body of rigid resin having a cylindrical portion, having a ring-shaped groove and a bevel at an inner wall end of said cylindrical portion; and a hard cap nut having an inner shoulder with a hook that forms an acute angle relative to the tube wall, wherein a major portion of the large diameter portion of the fluorocarbon resin tube is inserted into the ring-shaped groove; and wherein a tube clamp portion, as a hermetic portion presses said tube crimp portion against the inner wall end of the cylindrical portion with the inner shoulder of the hard cap nut by tightening the hard cap nut on an external thread of the outer wall of the cylindrical portion.

2. A joint for coupling tubes by fitting one end of a tube, said tube having an expanded end, prior to engagement with said joint, around an end portion of a main body of the joint inserted into a tapped hole of a cap nut and supporting the end of the tube with the cap nut screwed on the main body, said cap nut having an inner wall formed in the tapped hole orthogonal to the center line of the tapped hole, an internal thread formed on the inner surface of the tapped hole and an insertion opening cut through the inner wall along the center line for inserting the tube, said main body of the joint having a cylindrical portion, formed at the end of the main body which is inserted into the tapped hole of the cap nut where the tube inserted through the insertion opening of the cap nut fits around the main body and keeps the expanded end of said tube;

an external thread formed on a base side, from which the cylindrical portion is elongated, for screwing into the cap nut and a through hole cut through the main body along the main body center line having approximately the same diameter as the inner diameter of the tube and having a bevel at an end of the cylindrical portion, the bevel being formed from the inside of the through hole to the outside a minor diameter of the internal thread and the diameter of the inner surface of the cap nut being nearly equal or slightly larger than the outer diameter of the tube fitted around the cylindrical portion.

3. A joint for coupling tubes by fitting one end of a tube, said tube having an expanded end, prior to engagement with said joint, around an end portion of a main body of the joint inserted into a tapped hole of a cap nut and supporting the end of the tube with the cap nut screwed on the main body, said cap nut having an inner wall formed in the tapped hole orthogonal to the center line of the tapped hole and having an acute-angle hook sloped towards a point at the center line in the tapped hole, an internal thread formed on the inner surface of the tapped hole and an insertion opening cut through the inner wall along the center line for inserting the tube, said main body of the joint having a cylindrical portion, formed at the end of the main body, which is inserted into the tapped hole of the cap nut where the tube inserted through the insertion opening of the cap nut fits around the main body and keeps the expanded end of said tube; an external thread formed on a base side, from which the cylindrical portion is elongated, for screwing into the cap nut and a through hole cut through the main body along the main body center line having approximately the same diameter as the inner diameter of the tube and having a bevel at an end of the cylindrical portion, the bevel being formed from the inside of the through hole to the outside of the hole, a minor diameter of the internal thread and the diameter of the inner surface of the cap nut being equal or nearly equal to the outer diameter of the tube fitted around the cylindrical portion.

* * * * *

UNITED STATES PATENT AND TRADEMARK OFFICE
CERTIFICATE OF CORRECTION

PATENT NO. : 6,022,053
DATED : February 8, 2000
INVENTOR(S) : Shin-Ichi Hukuda

It is certified that error appears in the above-identified patent and that said Letters Patent is hereby corrected as shown below:

The sheet of drawings consisting of figures 8 and 9 should be deleted to appear attached sheet.

Signed and Sealed this

Thirteenth Day of March, 2001

Attest:

NICHOLAS P. GODICI

*Attesting Officer*     *Acting Director of the United States Patent and Trademark Office*

FIG.8

| RECOVERY RATE | THIS INVENTION (BEVEL ANGLE : 30°) | PRIOR ART (NO BEVEL ANGLE) |
|---|---|---|
| 50% | 47 sec | 143 sec |
| 90% | 113 sec | 588 sec |

FIG.9

MEASURED DRAWING STRENGTH

| TUBE SIZE | THIS INVENTION (TAPER ANGLE : 20°) | PRIOR ART (NO TAPER ANGLE) |
|---|---|---|
| φ9.53 × φ7.53 | 385 N | 319 N |
| φ6.35 × φ4.35 | 240 N | 197 N |